(12) United States Patent
Kjeldsen et al.

(10) Patent No.: US 12,000,372 B2
(45) Date of Patent: Jun. 4, 2024

(54) WIND TURBINE BLADE

(71) Applicant: Vestas Wind Systems A/S, Aarhus (DK)

(72) Inventors: Preben Kjeldsen, Ringkobing (DK); Thomas Schmidt, Ringkobing (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 18/013,030

(22) PCT Filed: Jul. 1, 2021

(86) PCT No.: PCT/DK2021/050219
§ 371 (c)(1),
(2) Date: Dec. 27, 2022

(87) PCT Pub. No.: WO2022/002337
PCT Pub. Date: Jan. 6, 2022

(65) Prior Publication Data
US 2023/0332572 A1 Oct. 19, 2023

(30) Foreign Application Priority Data
Jul. 3, 2020 (DK) .......................... PA 2020 70459

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F03D 1/0641* (2013.01);
(Continued)

(58) Field of Classification Search
CPC combination set(s) only.
See application file for complete search history.

(56) References Cited

U.S. PATENT DOCUMENTS

| 2010/0068065 A1* | 3/2010 | Jensen | F03D 3/062 416/223 R |
| 2011/0008175 A1* | 1/2011 | Gau | F03D 1/0675 416/233 |

(Continued)

FOREIGN PATENT DOCUMENTS

| EP | 3505751 A1 | 7/2019 |
| WO | 2015067281 A1 | 5/2015 |

(Continued)

OTHER PUBLICATIONS

Danish Patent and Trademark Office, Reply to Patent Application and Search Report issued in PA 2020 70459, Jan. 2019 (7 pages).
International Searching Authority, Search Report and Written Opinion issued in PCT/DK2021/050219, mailed Oct. 8, 2021 (13 pages).

*Primary Examiner* — Binh Q Tran
(74) *Attorney, Agent, or Firm* — Wood Herron & Evans LLP

(57) ABSTRACT

In a first aspect of the invention there is provided a wind turbine blade comprising a blade shell that extends in a spanwise direction from a root end to a tip end, and in a chordwise direction from a leading edge to a trailing edge. The blade shell comprises a spar cap formed from a plurality of substantially planar strips of reinforcing material, the strips being arranged in a plurality of stacks extending longitudinally in the spanwise direction and arranged side-by-side in the chordwise direction. In each stack an uppermost strip defines an upper surface of the stack, a lowermost strip defines a lower surface of the stack, and longitudinal edges of the stacked strips define side surfaces of the stack. The blade further comprises a retaining clip comprising a plurality of side-by-side substantially U-shaped sections. The U-shaped sections each comprise a pair of mutually-spaced side portions defining a stack-receiving region therebetween, and the side portions are joined by a bridging portion. At least some of the stacks are located in the (Continued)

stack-receiving regions of the retaining clip, such that the side portions of the U-shaped sections abut side surfaces of the stacks. Each U-shaped section of the retaining clip is inverted with respect to its neighbouring U-shaped section(s) such that the bridging portions of the respective U-shaped sections extend alternately across the upper and lower surfaces of the stacks in the chordwise direction.

15 Claims, 5 Drawing Sheets

(52) U.S. Cl.
CPC .......... *F03D 1/0677* (2023.08); *F03D 1/0681* (2023.08); *F03D 1/0682* (2023.08); *F03D 1/0684* (2023.08); *F03D 1/0685* (2023.08); *F05B 2220/705* (2020.08); *F05B 2230/60* (2013.01); *F05B 2240/21* (2013.01); *F05B 2260/30* (2013.01)

(56) References Cited

U.S. PATENT DOCUMENTS

| | | |
|---|---|---|
| 2011/0187115 A1* | 8/2011 | Piasecki .................... F03D 9/25 290/55 |
| 2012/0082558 A1 | 4/2012 | Baker et al. |
| 2012/0107129 A1* | 5/2012 | Kulenkampff .......... B29C 66/61 29/889.71 |
| 2014/0193255 A1* | 7/2014 | Hancock ................. F03D 7/022 416/1 |
| 2016/0305399 A1 | 10/2016 | Spandley et al. |
| 2017/0050372 A1* | 2/2017 | Nielsen .................. F03D 1/0675 |
| 2017/0218918 A1 | 8/2017 | Cieslak et al. |
| 2018/0223797 A1 | 8/2018 | Caruso et al. |
| 2019/0032632 A1* | 1/2019 | Danielsen ............... F03D 80/50 |
| 2019/0338750 A1* | 11/2019 | Bech ...................... F03D 1/0675 |

FOREIGN PATENT DOCUMENTS

| | | |
|---|---|---|
| WO | 2019212532 A1 | 11/2019 |
| WO | 2019238606 A1 | 12/2019 |

* cited by examiner

WIND TURBINE BLADE

TECHNICAL FIELD

The present invention relates generally to wind turbines and more specifically to a wind turbine blade and a method for making a wind turbine blade.

BACKGROUND

Modern wind turbine blades typically comprise a shell defining the aerodynamic contour of the blade and one or more longitudinally-extending spars which act as the main load-bearing structures of the blade. A spar typically comprises a shear web connected between opposed spar caps provided respectively on windward and leeward sides of the blade.

Spar caps are configured to absorb bending loads experienced by the blade in use and therefore typically comprise a material with a high tensile strength, such as carbon fibre reinforced plastic (CFRP). In some wind turbine blades, the spar caps are formed of a plurality of strips of reinforcing material arranged in a plurality of side-by-side stacks to allow the spar caps to conform to the chordwise curvature of the blade.

The aerodynamic profile of a modern wind turbine blade typically twists along the length of the blade to capture energy from the wind most effectively. A mould configured to form the blade shell therefore typically comprises a mould surface with an inclination that varies along its length. However, the varying inclination of the mould surface introduces challenges when manufacturing a blade having a spar cap formed of stacked strips. In particular, the stacked strips have a tendency to move or slide on steeply inclined sections of the mould due to gravity, and maintaining the strips in their intended positions can be difficult.

It is against this background that the present invention has been developed.

SUMMARY OF INVENTION

In a first aspect of the invention there is provided a wind turbine blade comprising a blade shell that extends in a spanwise direction from a root end to a tip end, and in a chordwise direction from a leading edge to a trailing edge. The blade shell comprises a spar cap formed from a plurality of substantially planar strips of reinforcing material, the strips being arranged in a plurality of stacks extending longitudinally in the spanwise direction and arranged side-by-side in the chordwise direction. In each stack an uppermost strip defines an upper surface of the stack, a lowermost strip defines a lower surface of the stack, and longitudinal edges of the stacked strips define side surfaces of the stack. The blade further comprises a retaining clip comprising a plurality of side-by-side substantially U-shaped sections. The U-shaped sections each comprise a pair of mutually-spaced side portions defining a stack-receiving region therebetween, and the side portions are joined by a bridging portion. At least some of the stacks are located in the stack-receiving regions of the retaining clip, such that the side portions of the U-shaped sections abut side surfaces of the stacks. Each U-shaped section of the retaining clip is inverted with respect to its neighbouring U-shaped section (s) such that the bridging portions of the respective U-shaped sections extend alternately across the upper and lower surfaces of the stacks in the chordwise direction.

During manufacture of the blade, the retaining clip maintains the positions of the strips in their respective stacks and prevents the strips from sliding or otherwise moving with respect to each other.

The inverted arrangement of neighbouring U-shaped sections means that a U-shaped section of the retaining clip having a bridging portion that extends across the upper surface of a stack will be immediately adjacent to at least one U-shaped section having a bridging portion that extends across the lower surface of a stack. Similarly, a U-shaped section with a bridging portion that extends across the lower surface of a stack will be immediately adjacent to at least one U-shaped section having a bridging portion that extends across the upper surface of a stack. The retaining clip may resemble a square waveform.

The 'uppermost' and 'lowermost' strips of the stack refer to the uppermost and lowermost strips at the spanwise location of the retaining clip. It will be appreciated that the number of strips in the stack may vary in different spanwise locations of the blade, for example the number of strips may drop off towards the ends of the stacks such that the spar cap tapers in height towards its ends.

The retaining clip may have a first U-shaped section at a first end and a second U-shaped section at a second end. These U-shaped sections are also referred to as "endmost" U-shaped sections. The retaining clip may have any number of intermediate U-shaped sections between the endmost sections. The number of U-shaped sections in total preferably corresponds to the number of side-by-side stacks. In such cases, each U-shaped section of the retaining clip may accommodate a single stack. In other examples, each U-shaped section may accommodate multiple stacks.

At least one U-shaped section of the retaining clip, preferably an endmost section, may comprise a return flange extending from a side portion of the U-shaped section. The return flange may extend substantially parallel to and spaced apart from the bridging portion of that U-shaped section. A stack may be located between the bridging portion and the return flange such that the bridging portion extends across one of the upper or lower surfaces of a stack and the return flange extends at least partially across the other of the upper or lower surfaces of the stack. During manufacture of the blade, the stack may be gripped between the return flange and the bridging portion.

An end of the retaining clip may comprise a locating flange. The locating flange may extend in the chordwise direction beneath a blade shell component located adjacent the spar cap. The blade shell component is preferably a panel of core material. The core material may comprise a material such as structural foam, polystyrene, or balsa wood for example.

The locating flange may extend from a side portion of an endmost U-shaped section. The locating flange may be substantially co-planar with the return flange. The two flanges may extend chordwise in opposite directions from the side portion of an endmost U-shaped section.

The side-by-side stacks may be spaced apart slightly in the chordwise direction by the side portions of the U-shaped sections of the retaining clip.

The wind turbine blade may comprise one or more pairs of retaining clips arranged side-by-side in the spanwise direction. The U-shaped sections of one of the retaining clips in each pair may be inverted relative to the U-shaped sections of the other retaining clip in the pair.

Preferably, each stack is located in a U-shaped section of one of the retaining clips in the pair and in a corresponding U-shaped section of the other retaining clip in the pair.

Accordingly, a bridging portion of a U-shaped section of one of the retaining clips in the pair may extend across one of the upper or lower surfaces of a stack, whilst a bridging portion of a U-shaped section of the other retaining clip in the pair may extend across the other of the upper and lower surfaces of the stack.

The wind turbine blade may comprise a plurality of retaining clips, or a plurality of pairs of retaining clips. The plurality of retaining clips, or the plurality of pairs of retaining clips may be mutually spaced in the spanwise direction.

One or more of the stacks may comprise a tapered end region. The or each retaining clip may be positioned outside of the tapered end region.

A chordwise cross-sectional profile of the stack-receiving regions of the retaining clip preferably substantially corresponds in shape to a chordwise cross-sectional profile of the stacks. Preferably the stacks and the stack-receiving regions of the retaining clip are substantially rectangular in chordwise cross-section.

Side portions of the U-shaped sections may have a height that substantially corresponds to a height of the stacks. The stacks comprise a plurality of planar strips of reinforcing material which are arranged in layers. The stacks may also comprise layers of material (such as glass or carbon fabric) interleaved between the planar strips. The height of the stacks is the distance between the uppermost layer of the stack and the lowermost layer of the stack.

The bridging portions of the U-shaped sections may have a length that substantially corresponds to a chordwise width of the stacks.

The or each retaining clip may be formed of a fibre-reinforced polymer material. The or each retaining clip may be a pre-cured component. The retaining clip may therefore comprise resin that is already cured before the strip is positioned in relation to the stacks. The retaining clip could also be formed from a high strength plastic moulding.

In a second aspect of the invention there is provided a method of manufacturing a wind turbine blade. The method comprises providing a blade shell mould that extends in a spanwise direction from a root end to a tip end and in a chordwise direction from a leading edge to a trailing edge, and providing a plurality of substantially planar strips of reinforcing material. The method further comprises arranging the strips in the mould in a plurality of stacks to form at least part of a spar cap, the stacks extending in the spanwise direction and being arranged side-by-side in the chordwise direction. In each stack an uppermost strip defines an upper surface of the stack, a lowermost strip defines a lower surface of the stack, and longitudinal edges of the stacked strips define side surfaces of the stack. The method further comprises providing a retaining clip comprising a plurality of side-by-side substantially U-shaped sections. Each U-shaped section comprises a pair of mutually-spaced side portions defining a stack-receiving region therebetween, the side portions being joined by a bridging portion. The method further comprises arranging at least some of the stacks in the stack-receiving regions of the retaining clip, such that the side portions of the U-shaped sections abut the side surfaces of the stacks. Each U-shaped section of the retaining clip is inverted with respect to its neighbouring U-shaped section(s) such that the bridging portions of the respective U-shaped sections extend alternately across the upper and lower surfaces of the stacks in the chordwise direction.

In a further aspect of the invention there is provided a retaining clip for a wind turbine blade spar cap configured to retain strips of reinforcing material in a stacked formation and restrict movement of a plurality of stacks of strips relative to one another. The clip comprises a series of substantially U-shaped sections each having a pair of mutually-spaced side portions joined by a bridging portion. Each U-shaped section is inverted with respect to its neighbouring U-shaped section(s).

Optional features described in relation to the first aspect of the invention are equally applicable to any other aspect of the invention, repetition of these features is avoided purely for reasons of conciseness.

BRIEF DESCRIPTION OF FIGURES

Embodiments of the present invention will now be described by way of non-limiting example only, with reference to the accompanying figures, in which.

DETAILED DESCRIPTION

Figure 1:
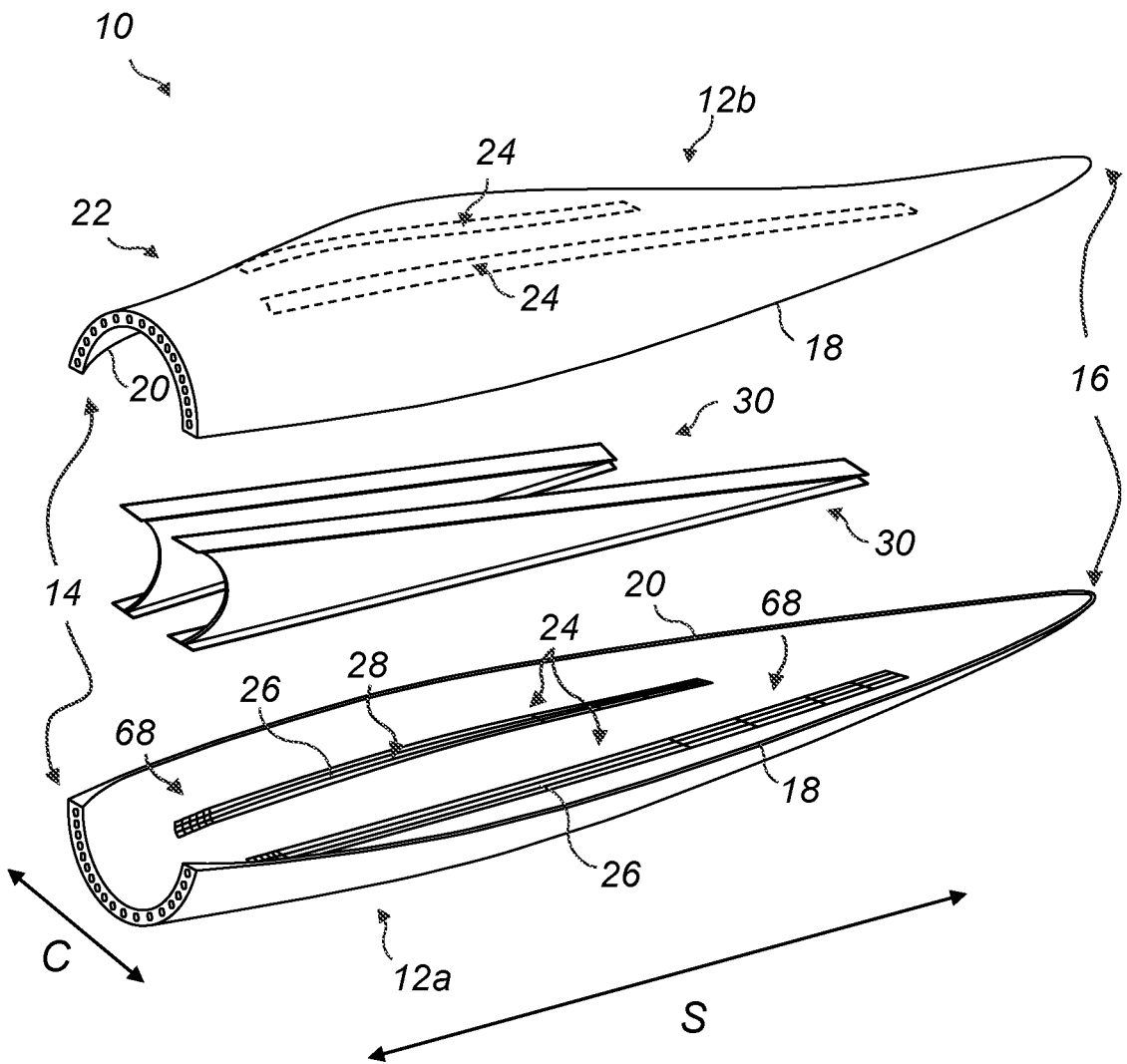
FIG. 1 is a schematic exploded view of a wind turbine blade comprising a shell formed of two half shells each comprising a spar cap formed of stacks of strips of reinforcing material.

FIG. 1 shows a schematic exploded view of a wind turbine blade 10. The blade 10 comprises a first half shell 12a and a second half shell 12b which each extend in a spanwise direction (S) from a root end 14 of the blade 10 to a tip end 16, and in a chordwise direction (C) between a leading edge 18 and a trailing edge 20. The first and second half shells 12a, 12b are joined together to form a blade shell 22. The blade shell 22 defines an aerodynamic contour and is configured to capture energy from wind incident on the blade 10. The blade shell 22 may twist along its spanwise length to capture wind energy most effectively.

The blade 10 further comprises longitudinally-extending spar caps 24 to take up bending loads experienced by the blade 10 in use. The half shells 12 comprise spar caps 24 which may be embedded in laminate layers of the half shell 12, forming a so-called structural shell. The spar caps 24 are formed of a plurality of substantially planar strips of reinforcing material 26 arranged side-by-side in stacks 28 which extend longitudinally in the spanwise direction (S). The blade 10 may further comprise shear webs 30 bonded between the mutually-opposed spar caps 24 of the first and second half shells 12a, 12b to form spar structures which provide structural support for the blade 10 in use.

As described by way of background above, the strips of reinforcing material 26 may comprise a relatively stiff material such as carbon fibre reinforced plastic (CFRP). As such, the strips 26 may comprise an inherent elastic resilience, due to the tensile nature of the reinforcing material, which causes the strips 26 to be somewhat resistant to twisting along their longitudinal length. This can present issues during manufacture of the blade 10, as will now be described with reference to FIG. 2.

Figure 2:
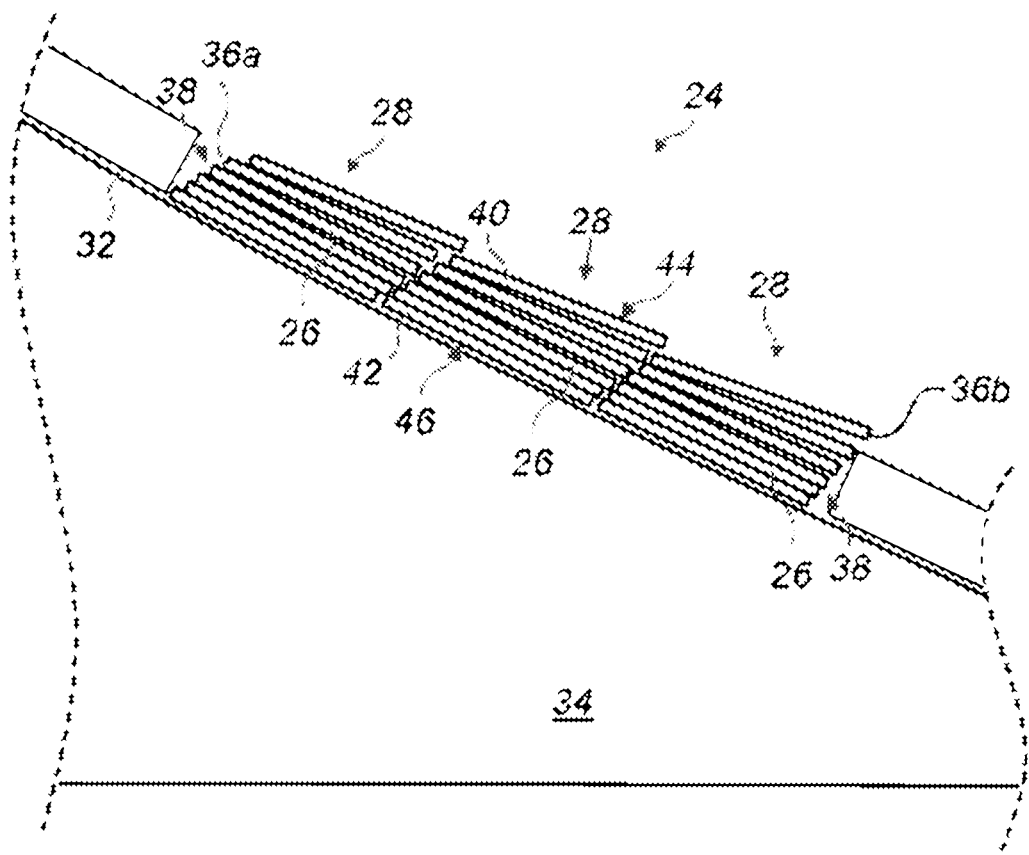
FIG. 2 is a cross-sectional view of a blade mould during the manufacture of a half shell showing a number of difficulties arising from the use of strips of reinforcing material.

FIG. 2 shows a plurality of strips of reinforcing material 26 arranged on a mould surface 32 of a blade shell mould 34 in a plurality of stacks 28 to form a spar cap 24. Longitudinal edges 36 of the strips 26 in a stack 28 define side surfaces 38 of that stack, and an uppermost strip 40 and lowermost strip 42 in each stack 28 define upper and lower surfaces 44, 46 of that stack. The stacks 28 shown in FIG. 2 should be substantially rectangular in chordwise cross section. However, the strips 26 in the stacks 28 are not restrained and may therefore move relative to one another in the mould 34.

To form a blade shell 22 which twists along its spanwise length, the mould 34 may comprise a mould surface 32 having an inclination that varies between a root end of the mould 34 and a tip end of the mould 34. In some cases, the elastic resilience of the reinforcing material can constrain the twist of the strips 26 such that the strips 26 do not conform to the variations in the inclination of the mould surface 32 unaided. The transition between a relatively flat outboard portion of the mould surface 32 and a relatively steeply inclined surface 32 in a root portion can be particularly problematic.

Internal stresses resulting from twisting the strips 26 act to pull the strips 26 back to their flat, neutral state. These torsional stresses cause a first longitudinal edge 36a of each strip 26 to be pressed down towards the mould surface 32 whilst a second longitudinal edge 36b of each strip 26 is lifted from the mould surface 32 as the strip 26 attempts to untwist itself. As shown in FIG. 2, this may result in the formation of a step between adjacent stacks 28 where the upper surfaces 44 of neighbouring stacks 28 are not flush, i.e. are not co-planar.

Steps between adjacent stacks 28 can cause material that is arranged on top of the stacks 28 in the mould 34, such as glass fibre mats, to become wrinkled. Such wrinkling can cause stress concentrations in the laminate structure of the shell 22, and also presents an uneven surface for the shear webs 30 to bond to, decreasing the strength of the connection between the webs 30 and the half shells 12.

A portion of the mould surface 32 configured to form a root portion of the blade shell 22 with a substantially circular cross-sectional profile may be relatively steeply inclined. The steep inclination of the mould surface 32 in this region can cause the strips 26 in the stacks 28 to slide relative to one another. This undesired sliding may result in a so-called "book effect", whereby the stack 28 resembles a spine cocked book. This can result in misalignment of the strips 26, and may also result in other shell components arranged adjacent to the stacks 28 being incorrectly positioned in the mould 34.

In order to overcome at least some of the above described difficulties involved in manufacturing a wind turbine blade 10, the strips 26 may be held in place by a retaining clip 48 such as those shown in the remaining figures.

Figure 3A:
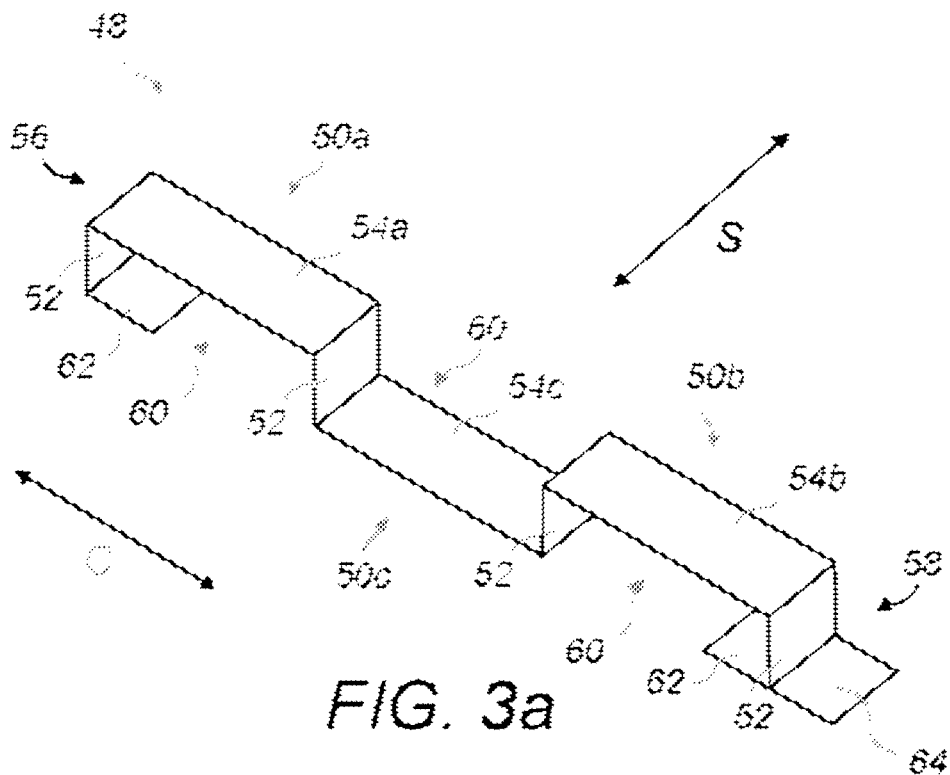
FIG. 3a is a schematic perspective view of a retaining clip used to maintain the position of strips and stacks relative to one another during manufacture of a half shell.
Figure 3B:
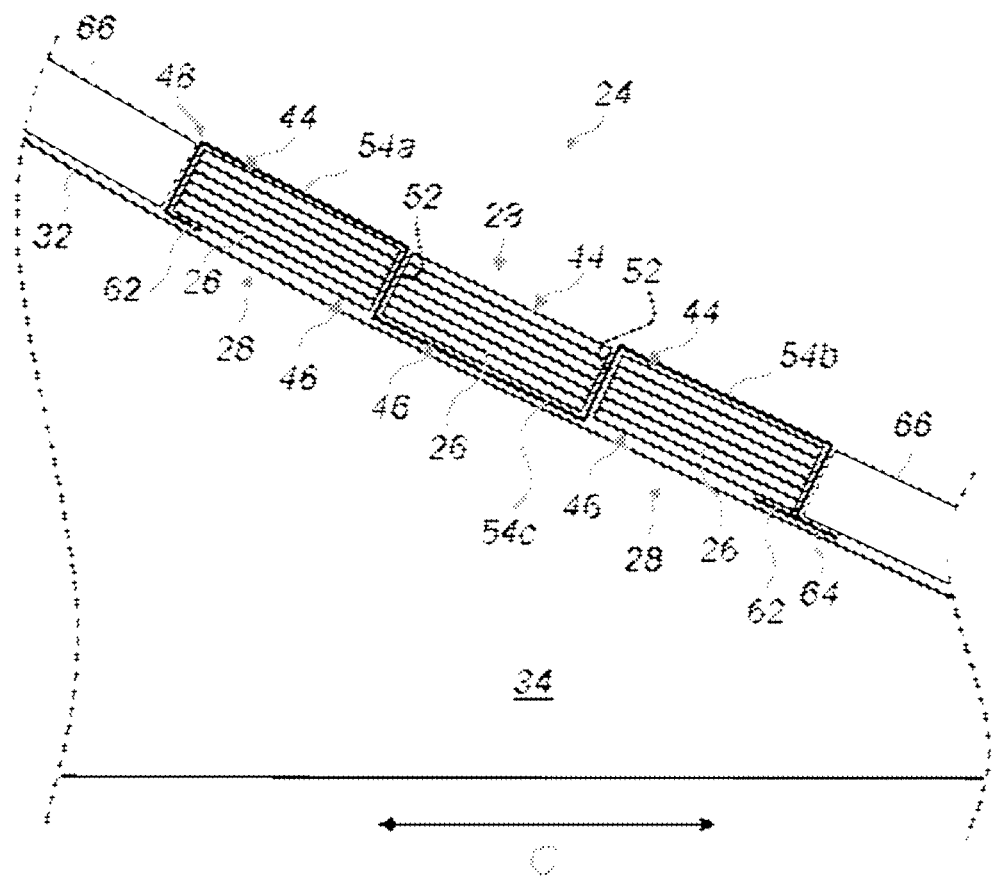
FIG. 3b is a schematic cross-sectional view of a plurality of stacks of strips arranged in U-shaped sections of the retaining clip.

With reference now to FIGS. 3a and 3b, a retaining clip 48 according to an example of the present invention comprises a plurality of substantially U-shaped sections 50 that are configured to receive the stacks 28 of strips 26 that form a spar cap 24. The retaining clip 48 shown in FIGS. 3a and 3b comprises three side-by-side U-shaped sections 50. The U-shaped sections 50 are formed of mutually-spaced side portions 52 that are joined by bridging portions 54 extending transversely between the side portions 52. Each U-shaped section 50 is inverted with respect to its neighbouring U-shaped section or sections. As such, the bridging portions 54 of adjacent U-shaped sections 50 extend between opposite ends of the side portions 52.

A first U-shaped section 50a defines a first end 56 of the retaining clip 48, and a second U-shaped section 50b defines a second end 58 of the retaining clip 48. The first and second U-shaped sections 50a, 50b may therefore be referred to as endmost U-shaped sections. The retaining clip 48 in FIGS. 3a and 3b additionally comprises an intermediate U-shaped section 50c between the endmost U-shaped sections 50a, 50b. The retaining clip 48 may comprise any number of intermediate U-shaped sections 50c between the endmost U-shaped sections 50a, 50b, including no intermediate U-shaped sections 50c. For example, the retaining clips 48 shown in FIGS. 5a and 5b comprise first and second U-shaped sections 50a, 50b and no intermediate U-shaped sections 50c.

The U-shaped sections 50 define stack-receiving regions 60 in which the stacks 28 of strips 26 are arranged as shown in FIG. 3b. Each stack-receiving region 60 may be configured to receive a single stack 28 of strips 26. When viewed in chordwise cross section, the shape of the stack-receiving regions 60 preferably corresponds to a cross-sectional profile of the stacks 28 as shown in FIG. 3b. For example, where the stacks 28 of strips 26 are substantially rectangular in cross section, the corresponding stack-receiving regions 60 in which the stacks 28 are arranged are preferably also substantially rectangular in cross-sectional shape.

The retaining clip 48 is configured to form a close fit around the stacks 28. As such, the side portions 52 of the U-shaped sections 50 preferably have a height that substantially corresponds to a height of the stack 28 arranged in a given receiving region 60. Similarly, the length of each bridging portion 54 preferably corresponds to a chordwise width of the stack 28 arranged in the respective receiving region 60. The bridging portion 54 fixes the distance between the side portions 52. Substantially matching the length of the bridging portion 54 to the width of a stack 28 therefore means that the stack 28 is gripped in the stack-receiving region 60 between the side portions 52 by an interference fit.

When the stacks 28 are arranged in receiving regions 60 of the retaining clip 48, the side surfaces 38 of the stacks 28 abut the side portions 52 of the U-shaped sections 50. The side portions 52 abutting the side surfaces 38 of the stacks 28 prevent the strips 26 from sliding, thereby avoiding the previously described "book-effect", and maintaining the position of the strips 26 relative to one another in the chordwise direction (C).

The side-by-side stacks 28 are spaced apart slightly in the chordwise direction (C) by the side portions 52 of the U-shaped sections 50 of the retaining clip 48. As such, the retaining clip 48 ensures that a gap is maintained between adjacent stacks 28. During manufacture of the half shell 12, the gap between stacks 28 may help to promote a thorough infusion of resin throughout the materials arranged in the mould 34.

With the stacks 28 arranged in the stack-receiving regions 60 of the retaining clip 48, the inverted orientation of neighbouring U-shaped sections 50 relative to one another results in the bridging portions 54 of the U-shaped sections 50 extending alternately across the upper and lower surfaces 44, 46 of the stacks 28 in the chordwise direction (C). As shown in FIG. 3b, alternating which surface 44, 46 the bridging portions 54 extends across means that, for example, the bridging portion 54a of the first U-shaped section 50a extends across the upper surface 44 of a stack 28, the bridging portion 54c of the neighbouring intermediate U-shaped section 50c extends across the lower surface 46 of a stack 28, and the bridging portion 54b of the neighbouring second U-shaped section 50b again extends across the upper surface 44 of a stack 28. When viewed in chordwise cross section, the retaining clip 48 may therefore substantially resemble a square wave. The retaining clip 48 may be considered to weave between the side-by-side stacks 28 in the chordwise direction (C).

A stack 28 arranged in a U-shaped section 50 having a bridging portion 54 that extends across the lower surface 46 of the stack 28, exerts a downwards pressure on that bridging portion 54 of the retaining clip 48. The retaining clip 48 utilises this downwards pressure to counteract an upwards pressure, caused by the internal torsional stresses described previously, exerted by a neighbouring stack 28 on a bridging portion 48 that extends across the upper surface 44 of that stack. The alternating bridging portions 54 therefore ensure that the strips 26 of a stack 28 cannot untwist because the bridging portion 54 bears against the upper surface 44 and presses the stack 28 against the mould surface 32.

The retaining clip 48 may further comprise a return flange 62 to further secure the strips 26 in their respective stacks 28, and to secure a stack 28 in position relative to the other stack(s) 28. The return flange 62 may extend in the chordwise direction (C) from a side portion 52 of a U-shaped section 50, preferably an endmost U-shaped section 50a, 50b, and at least partially across an upper or lower surface 44, 46 of a stack 28 arranged in a receiving region 60 as shown in FIG. 3a. As shown in FIGS. 3a and 3b, the retaining clip 48 may comprise two return flanges 62, i.e. each of the endmost U-shaped sections 50a, 50b of the retaining clip 48 may comprise a return flange 62 extending from a respective side portion 52.

The return flanges 62 extend from the opposite end of a respective side portion 52 to that from which the bridging portion 54 extends. The return flanges 62 are therefore spaced apart from the bridging portion 54 of a given U-shaped section 50. One or more of the return flanges 62 may be substantially parallel to the bridging portion 54 of a given U-shaped section 50. In FIG. 3b the bridging portions 54a, 54b of the first and second U-shaped sections 50a, 50b extend across the upper surfaces 44 of their respective stacks 28, and the return flanges 62 therefore extend partially across the lower surfaces 46 of the stacks 28. Stacks 28 of strips 26 located between a bridging portion 54 and a return flange 62 may be gripped between said flange 62 and bridging portion 54 to restrict movement of the strips 26 in the stack 28 relative to one another. The return flanges 62 additionally help to fix the retaining clip 48 in position relative to the stacks 28. By clipping around one or more of the endmost stacks 28, the retaining clip 48 is better equipped to withstand the elastic forces in the strips 26 that act to spring the strips 26 apart in the stacks 28.

The retaining clip 48 may also comprise a locating flange 64 extending in the chordwise direction (C) from a side portion 52 of an endmost U-shaped section 50a, 50b. Such a locating flange 64 may be configured for arrangement beneath blade shell components 66 arranged adjacent to the stacks 28 during manufacture of the blade shell 22, as will be described later in more detail. The locating flange 66 extends in the chordwise direction (C) in the opposite direction to the return flange 62, i.e. away from the stack-receiving region 60. Where the return flange 62 is configured to interface against a lower surface 46 of a stack 28, the locating flange 64 may be substantially co-planar with the return flange 62 so that the retaining clip 48 sits flush against the mould surface 32.

With reference still to FIGS. 3a and 3b, the strips 26 may be individually arranged in stacks 28 and with the retaining clip 48 in the mould 34 during manufacture of the blade shell 22. Alternatively, the strips of reinforcing material 26 may be arranged in side-by-side stacks 28 offline (i.e. outside of the blade shell mould 34) as a sub-assembly to reduce in-mould time during manufacture of the blade shell 22. Regardless of where the strips 26 are arranged, the process for arranging the strips 26 together with a retaining clip 48 to form a spar cap 24 is the same.

The strips of reinforcing material 26 are arranged in stacks 28 which, when arranged in the mould 34, extend longitudinally in the spanwise direction (S). The stacks 28 are arranged in the stack-receiving regions 60 of a retaining clip 48 configured with U-shaped sections 50 that are adjacent one another in the chordwise direction (C). The stacks 28 arranged in the U-shaped sections 50 are therefore arranged side-by-side in the chordwise direction (C). Where the retaining clip 48 comprises a return flange 62, the stack 28 is clipped into the receiving region 60 and held in place by the bridging portion 54 of that U-shaped section 50 and the return flange 62 interfacing against opposing surfaces 44, 46 of the stack 28.

Manufacturing the blade shell 22 may also include arranging other blade shell components 66, such as core material panels of structural foam, adjacent to the stacks 28 in the mould 34. If the retaining clip 48 comprises a locating flange 64 extending chordwise from a side portion 52 of a U-shaped section 50, the method may also include arranging the retaining clip 48 and/or stacks 28 in the mould 34 such that the locating flange 64 is positioned between the blade shell components 66 and the mould surface 32. For example, this may include sliding the retaining clip 48 and/or stacks 28 in the chordwise direction (C) to arrange the locating flange 64 beneath the shell components 66. Alternatively, the retaining clip 48 and/or stacks 28 may first be arranged in the mould 34, with the shell components 66 then being arranged on top of the locating flange 64 and adjacent to the stacks 28 in the mould 34.

The retaining clip 48 maintains the position of each strip 26 in its respective stack 28 during manufacture of the blade shell 22. The side portions 52 of the retaining clip 48 prevent the strips 26 from sliding or otherwise moving with respect to each other, and the bridging portions 54 extending over the upper surfaces 44 of the stacks 28 prevent the strips 26 from untwisting or pulling away from the mould surface 32. The retaining clip 48 therefore ensures that the strips of reinforcing material 26 are accurately aligned in the blade shell mould 34, and that other blade shell components 66 arranged adjacent to the stacks 28 are accurately positioned.

The blade materials arranged in the mould 34 may be infused with resin to form the half shell 12. In another example, the blade materials may comprise pre-impregnated fibres. The retaining clip 48 holds the strips 26 in the stacks 28 throughout manufacture of the blade 10 and remains embedded in the blade shell 22 even after manufacture of the blade 10 is complete, e.g. after the resin cures. The retaining clip 48 preferably has a spanwise width that is very small in comparison to the total length of the spar cap 24. Inclusion of the clip 48 in the laminate structure of a half shell 12 therefore has no detrimental effect on the load-bearing capacity of the spar cap 24. Further the retaining clip 48 is preferably lightweight so as not to unduly increase the mass of the blade 10. The retaining clip 48 preferably has a thickness that is as small as possible (such as 1 mm thick or less) in order to avoid deviations to the fabric layers that are subsequently placed on the clips.

Figure 4:
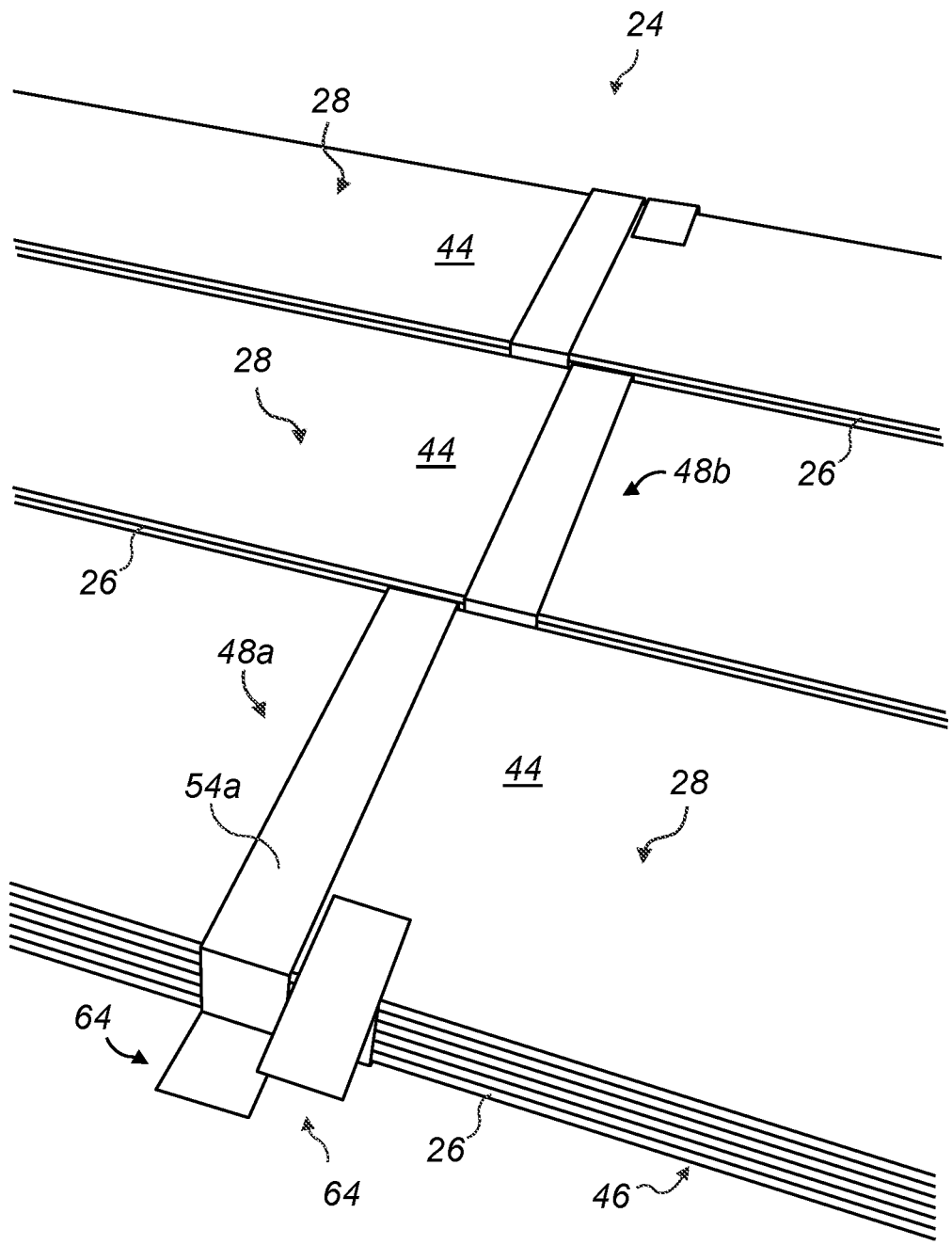
FIG. 4 is a schematic perspective view of a spanwise portion of a spar cap in which the stacks of strips are arranged with a pair of retaining clips.

FIG. 4 shows a pair of retaining clips 48 arranged with the stacks 28 of the spar cap 24. The retaining clips 48 are arranged side-by-side in the spanwise direction (S), and the stacks 28 of strips 26 are arranged in U-shaped sections 50 of both retaining clips 48. The retaining clips 48 may be arranged such that U-shaped sections 50 of a first clip 48a of the pair are inverted relative to corresponding U-shaped sections 50 of a second retaining clip 48b in the pair. The retaining clips 48a and 48b clips may be configured in substantially the same manner, with each clip 48 simply being inverted in orientation relative to the other. The upper surface 44 of each stack 28 interfaces with a bridging portion 54 of a retaining clip 48, ensuring that each of the stacks 28 is pressed down onto the mould surface 32.

A bridging portion 54 of the first or second retaining clip 48a, 48b extends across each of the upper and lower surfaces 44, 46 of a stack 28. For example, as shown in FIG. 4, a bridging portion 54a of the first retaining clip 48a extends across the upper surface 44 of the first stack 28, and a bridging portion (not shown) of the second retaining clip 48b extends across the lower surface 46 of that stack 28. A pair of retaining clips 48 arranged in this manner effectively serves to lock the strips 26 in position in each stack 28 by sandwiching the stack 28 between the respective bridging portions 54 of the clips 48. Where both the first and second retaining clips 48a, 48b comprise a locating flange 64, the locating flanges 64 may extend above and below a portion of adjacent blade shell components 66, thereby also locking such adjacent blade shell components in place.

The wind turbine blade 10 may comprise a plurality of retaining clips 48 arranged along the spanwise length of the spar cap 24. Similarly, the blade 10 may comprise a plurality of pairs of retaining clips 48 arranged along the length of the spar cap 24. The retaining clips 48, or pairs of clips 48 may be mutually spaced in the spanwise direction (S) of the blade 10. For example, the clips 48 or pairs of clips 48 may be spaced at intervals of between 3 m to 5 m along the length of the spar cap 24. Spacing the clips 48 or pairs of clips 48 apart in the spanwise direction (S) minimises any adverse effect of including a bridging portion 54 of a clip 48 in the bondline between a shear web 30 and the spar cap 24.

The retaining clips 48 are preferably arranged along the spar cap 24 in spanwise regions where the inclination of the mould surface 32 changes and thereby introduces torsion into the strips of reinforcing material 26. As explained above, the retaining clips 48 bear against upper surfaces 44 of the stacks 28 to ensure the strips 26 and stacks 28 are held in position despite the varying inclination of the mould surface 32.

Spar caps 24 in some wind turbine blades 10 may comprise one or more stacks 28 having a tapered end region 68 at a tip end or root end of the spar cap 24 (as shown in FIG. 1). The tapered end region 68 of a stack 28 may be formed by varying the number of strips 26 stacked on top of one another in different spanwise regions along the spar cap 24. For example, the number of strips 26 in a stack 28 may decrease near a root end and/or near a tip end of the stack 28 such that the spar cap 24 tapers in height near its root end and/or tip end. The tapered end region 68 may be provided to transfer load from the spar cap 24 to the laminate of the blade shell at the root and tip ends of the blade 10.

Where a blade 10 comprises stacks 28 with one or more tapered end regions 68, the retaining clip or clips 48 are preferably positioned outside of the tapered end region 68 to avoid interfering with the shear load transfer from the spar cap 24 to the laminate of the shell. For example, the strips 26 may be formed of carbon fibre and the blade shell laminate from glass fibre and by placing the clips 48 outside of the tapered regions, they will not interfere with the shear load transfer from the carbon to the glass.

Figure 5A:
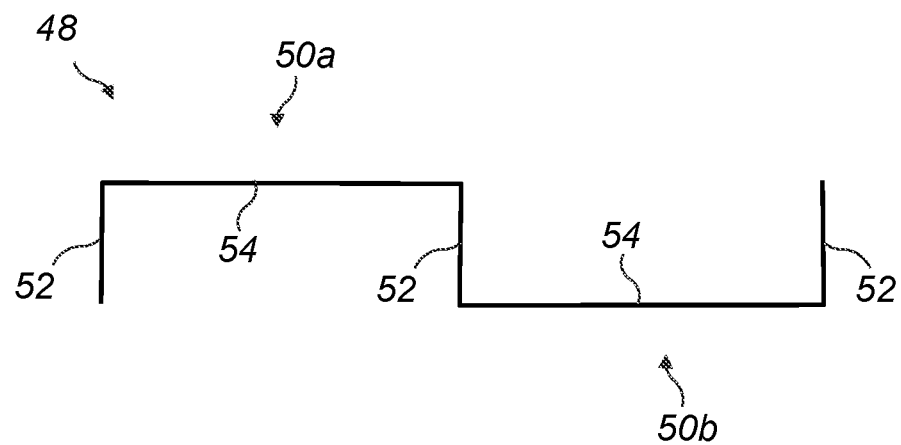
FIGS. 5a and 5b are schematic cross-sectional views of retaining clips in other examples.
Figure 5B:
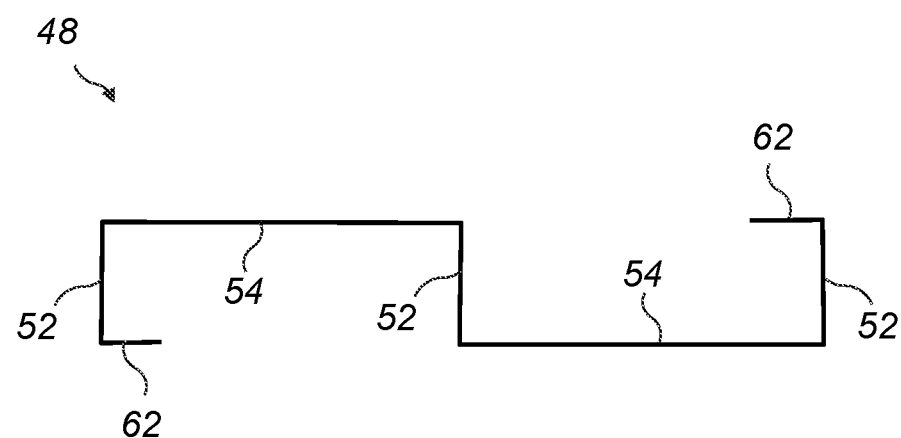

FIGS. 5a and 5b are provided merely to illustrate other examples of retaining clips 48 in accordance with the invention. For example, as noted above, a retaining clip 48 may comprise a first and second U-shaped section 50a, 50b and no intermediate sections 50c therebetween, as shown in FIGS. 5a and 5b. FIG. 5a shows a retaining clip 48 comprising inverted U-shaped sections 50a, 50b, and FIG. 5b shows a retaining clip 48 that additionally comprises return flanges 62 as previously described. It will be appreciated that the description provided previously with regards to features such as the inverted neighbouring U-shaped sections 50, their side portions 52 and bridging portions 54, and the return and locating flanges 62, 64 for example is also applicable to the retaining clips 48 shown in FIGS. 5a and 5b. As such, further description of such features will not be repeated here in the interest of conciseness.

A retaining clip 48 as described with reference to any of the accompanying figures may be formed of any suitable material. Preferably, the retaining clip 48 may be formed of fibre reinforced composite material such as glass fibre reinforced plastic (GFRP). For example, the retaining clip 48 may be formed of one or more layers of biaxial glass fibre plies laminated with a polymer resin. The resin is preferably cured, i.e. set before the stacks 28 of strips 26 are arranged with the retaining clip 48. As such, the retaining clip 48 may be a pre-cured component, i.e. cured before arrangement in the mould 34. The material of the retaining clip 48 preferably has a high tensile strength to resist the elastic forces exerted by the twisted strips of reinforcing material 26.

Preferably, the surface of the retaining clip 48 is activated (such as via abrasion or removal of a peel ply layer) so that the clip properly adheres to the surrounding blade materials during the manufacture of the blade 10.

A retaining clip 48 may be configured such that multiple stacks 28 may be arranged in a single receiving region 60 defined by a U-shaped section 50 of the clip 48. Alternatively or additionally, a retaining clip 48 may be configured to retain strips 26 in only some of the stacks 28 forming a spar cap 24. For example, a spar cap 24 may have three side-by-side stacks 28 and a retaining clip 48 as described herein may only have two side-by-side U-shaped sections 50 that are each configured to receive a single stack 28. As such, the invention is not limited to the number of U-shaped sections 50 matching the number of side-by-side stacks 28 that form the spar cap 24 of the wind turbine blade 10.

It will be appreciated that terms such as "interfacing", "abut" and "bear against" include both direct and indirect "interfacing", "abutment" and "bearing against". That is to say such terms are intended to cover examples wherein one or more intermediate components, such as a spacer, may be arranged between interfacing abutting surfaces.

Many modifications may be made to the examples described above without departing from the scope of the present invention as defined in the accompanying claims. It will be appreciated that features described in relation to each of the examples above may be readily combined with features described with reference to other examples without departing from the scope of the invention as defined by the following claims.

The invention claimed is:

1. A wind turbine blade comprising:
a blade shell that extends in a spanwise direction from a root end to a tip end, and in a chordwise direction from a leading edge to a trailing edge, the blade shell comprising:
a spar cap formed from a plurality of substantially planar strips of reinforcing material, the strips being arranged in a plurality of stacks extending longitudinally in the spanwise direction and arranged side-by-side in the chordwise direction, whereby in each stack an uppermost strip defines an upper surface of the stack, a lowermost strip defines a lower surface of the stack, and longitudinal edges of the stacked strips define side surfaces of the stack;
a retaining clip comprising a series of substantially U-shaped sections each having a pair of mutually-spaced side portions defining a stack-receiving region therebetween, wherein the side portions are joined by a bridging portion, and wherein each U-shaped section is inverted with respect to its neighbouring U-shaped section;
wherein at least some of the stacks are located in the stack-receiving regions of the retaining clip, such that the side portions of the U-shaped sections abut side surfaces of the stacks, and each U-shaped section of the retaining clip is inverted with respect to its neighbouring U-shaped section(s) such that the bridging portions of the respective U-shaped sections extend alternately across the upper and lower surfaces of the stacks in the chordwise direction.

2. The wind turbine blade of claim 1, wherein at least one U-shaped section of the retaining clip, comprises a return flange extending from a side portion of the U-shaped section substantially parallel to and spaced apart from the bridging portion of that U-shaped section, wherein a stack is located between the bridging portion and the return flange such that the bridging portion extends across one of the upper or lower surfaces of a stack and the return flange extends at least partially across the other of the upper or lower surfaces of the stack.

3. The wind turbine blade of claim 1, wherein an end of the retaining clip comprises a locating flange, and the locating flange extends in the chordwise direction beneath a blade shell component located adjacent the spar cap.

4. The wind turbine blade of claim 3, wherein the locating flange extends from a side portion of an endmost U-shaped section.

5. The wind turbine blade of claim 4, wherein at least one U-shaped section of the retaining clip comprises a return flange extending from a side portion of the U-shaped section substantially parallel to and spaced apart from the bridging portion of that U-shaped section, wherein a stack is located between the bridging portion and the return flange such that the bridging portion extends across one of the upper or lower surfaces of a stack and the return flange extends at least partially across the other of the upper or lower surfaces of the stack, and wherein the locating flange is substantially co-planar with the return flange and the two flanges extend chordwise in opposite directions from the side portion of an endmost U-shaped section.

6. The wind turbine blade of claim 1, wherein the side-by-side stacks are spaced apart in the chordwise direction by the side portions of the U-shaped sections of the retaining clip.

7. The wind turbine blade of claim 1, comprising one or more pairs of retaining clips arranged side-by-side in the spanwise direction, wherein the U-shaped sections of one of the retaining clips in each pair are inverted relative to the U-shaped sections of the other retaining clip in the pair.

8. The wind turbine blade of claim 1, comprising a plurality of retaining clips, or a plurality of pairs of retaining clips, mutually spaced in the spanwise direction.

9. The wind turbine blade of claim 1, wherein one or more of the stacks comprises a tapered end region and the or each retaining clip is positioned outside of the tapered end region.

10. The wind turbine blade of claim 1, wherein a chordwise cross-sectional profile of the stack-receiving regions of the retaining clip substantially corresponds in shape to a chordwise cross-sectional profile of the stacks.

11. The wind turbine blade of claim 1, wherein side portions of the U-shaped sections have a height that substantially corresponds to a height of the stacks and the bridging portions of the U-shaped sections have a length that substantially corresponds to a chordwise width of the stacks.

12. The wind turbine blade of claim 1, wherein the or each retaining clip is formed of a fibre-reinforced polymer material.

13. The wind turbine blade of claim 1, wherein the retaining clip is a pre-cured component.

14. A retaining clip for a wind turbine blade spar cap configured to retain strips of reinforcing material in a stacked formation and restrict movement of a plurality of stacks of strips relative to one another, the clip comprising:
a series of substantially U-shaped sections each having a pair of mutually-spaced side portions defining a stack-receiving region therebetween, wherein the side portions are joined by a bridging portion, wherein each U-shaped section is inverted with respect to its neighbouring U-shaped section; wherein at least some of the stacks are configured to be located in the stack-receiving regions of the retaining clip such that the side portions of the U-shaped sections abut side surfaces of the stacks, and the bridging portions of the respective U-shaped sections are configured to extend alternately across the upper and lower surfaces of the stacks in a chordwise direction.

15. A method of manufacturing a wind turbine blade, the method comprising:
providing a blade shell mould that extends in a spanwise direction from a root end to a tip end, and in a chordwise direction from a leading edge to a trailing edge;
providing a plurality of substantially planar strips of reinforcing material;
arranging the strips in the mould in a plurality of stacks to form at least part of a spar cap, the stacks extending in the spanwise direction and being arranged side-by-side in the chordwise direction, whereby in each stack an uppermost strip defines an upper surface of the stack, a lowermost strip defines a lower surface of the stack, and longitudinal edges of the stacked strips define side surfaces of the stack;
providing the retaining clip of claim 14; and
arranging at least some of the stacks in the stack-receiving regions of the retaining clip, such that the side portions of the U-shaped sections abut the side surfaces of the stacks, and the bridging portions of the respective U-shaped sections extend alternately across the upper and lower surfaces of the stacks in the chordwise direction.

* * * * *